United States Patent
Brasche et al.

(10) Patent No.: US 9,332,071 B2
(45) Date of Patent: May 3, 2016

(54) DATA STAGE-IN FOR NETWORK NODES

(71) Applicant: MICROSOFT TEHCNOLOGY LICENSING, LLC, Redmond, WA (US)

(72) Inventors: Gotz Philip Brasche, Dusseldorf (DE); Ramin Rezai Rad, Aachen (DE); Radu Marius Tudoran, Rennes (FR)

(73) Assignee: Microsoft Technology Licensing, LLC, Redmond, WA (US)

( * ) Notice: Subject to any disclaimer, the term of this patent is extended or adjusted under 35 U.S.C. 154(b) by 321 days.

(21) Appl. No.: 13/887,497

(22) Filed: May 6, 2013

(65) Prior Publication Data
US 2014/0330889 A1 Nov. 6, 2014

(51) Int. Cl.
*G06F 15/16* (2006.01)
*H04L 29/08* (2006.01)

(52) U.S. Cl.
CPC .......... *H04L 67/1095* (2013.01); *H04L 69/324* (2013.01)

(58) Field of Classification Search
USPC ................... 709/201, 202, 203, 218, 217, 219
See application file for complete search history.

(56) References Cited

U.S. PATENT DOCUMENTS

| | | | | | |
|---|---|---|---|---|---|
| 4,725,834 | A * | 2/1988 | Chang | .................. | H04L 12/1868 370/451 |
| 8,010,531 | B2 * | 8/2011 | Ruiz-Velasco | ...... | H04L 12/4625 707/736 |
| 2002/0141421 | A1 * | 10/2002 | Dupont | .............. | H04Q 11/0478 370/403 |
| 2007/0058600 | A1 * | 3/2007 | Chung | .................... | H04L 47/10 370/338 |
| 2009/0303938 | A1 * | 12/2009 | Kim | ........................ | H04L 5/023 370/329 |
| 2011/0219372 | A1 | 9/2011 | Agrawal et al. | | |
| 2011/0252071 | A1 * | 10/2011 | Cidon | ............... | G06F 17/30174 707/802 |
| 2011/0276963 | A1 | 11/2011 | Wu et al. | | |
| 2012/0089579 | A1 | 4/2012 | Ranade et al. | | |
| 2012/0155275 | A1 * | 6/2012 | Massoulie | .............. | H04L 45/64 370/236 |
| 2012/0226733 | A1 | 9/2012 | Kim et al. | | |

OTHER PUBLICATIONS

Peng, et al., "VDN: Virtual Machine Image Distribution Network for Cloud Data Centers", In Proceeding of IEEE INFOCOM, Mar. 25, 2012, 9 pages.
"IBM SmartCloud Storage Solutions", Pulished on: Feb. 23, 2013, Available at: http://www-01.ibm.com/software/tivoli/solutions/virtual-storage-center/.
Beloglazov, et al., "Energy Efficient Allocation of Virtual Machines in Cloud Data Centers", In 10th IEEE/ACM International Conference on Cluster, Cloud and Grid Computing, May 17, 2010, 2 pages.
Siebert, Eric, "Storage Management for Virtualized Servers", Published on: Jul. 24, 2011, Available at: http://searchvirtualstorage.techtarget.com/feature/Storage-management-for-virtualized-servers.

* cited by examiner

*Primary Examiner* — Lan-Dai T Truong
(74) *Attorney, Agent, or Firm* — Sandy Swain; Micky Minhas

(57) ABSTRACT

A method is described of downloading a data item from a source to each node of a plurality of nodes of a data center, wherein the data item is split in a plurality of disjoint chunks. The method includes receiving each chunk of the plurality of chunks from the source by only one node of the plurality of nodes; and distributing the plurality of chunks among the plurality of nodes within the data center until each node of the plurality of nodes has the plurality of chunks forming the data item.

20 Claims, 5 Drawing Sheets

DATA STAGE-IN FOR NETWORK NODES

BACKGROUND

Currently the standard way to stage-in data to a cloud virtual machine is to store the data to the cloud provider's storage system and then have code running on the virtual machine using the cloud provider's software development kit to download the data to the virtual machine. Accessing the cloud storage happens in a client/server fashion.

In a lot of scenarios for processing data in a data center, the same data needs to be present on more than one virtual machine. Typical use cases are embarrassingly parallel workloads, since they can be horizontally scaled to be processed on multiple virtual machines. Examples of this type of workloads are simulations, in particular Monte Carlo simulations which are common in various scientific disciplines. The simulation often has to be performed on a huge parameter space, which leads to lots of independent simulations. Each independent simulation run can be executed on a separate virtual machine to achieve near linear to linear parallelization. The main overhead of this approach is that common data items that are needed for each simulation need to be present on all virtual machines. Since the virtual machines act independently of each other, the same data items are downloaded by all virtual machines. This way there are multiple redundant transmissions of possibly huge data files (in the dimension of terabytes), e.g. for biological or meteorological data. From an efficiency perspective, eliminating these redundant transmissions leads to higher performance and lower costs for staging in data.

From a privacy perspective, even though cloud storage services are usually protected by strong security measures, many potential cloud users have concerns storing their data permanently in a cloud storage. They would rather prefer to stage-in their data directly from their on-premises infrastructure to their virtual machines in the cloud, without temporarily storing the data in the cloud storage.

The embodiments described below are not limited to implementations which solve any or all of the problems mentioned above.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

It is proposed to use a direct stage-in of data from a user's storage to each of a set of nodes in a data center. The nodes, for example virtual machines, located in the data center are connected together with much higher capacity than they are connected to internal or external (cloud) storage facilities. Instead of downloading the same data item n times to each of the n nodes, it is proposed that the original data item is split into disjoint (non-overlapping) chunks. Then, the nodes start downloading the chunks such that each chunk is received at only one of the nodes of the n nodes. Once each node has completed its part of the download task, the network that interconnects the nodes of the data center is used to internally distribute the downloaded chunks such that finally each participating node has all chunks that form the original data item.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a desktop computing system, the system described is provided as an example and not a limitation. As those skilled in the art will appreciate, the present examples are suitable for application in a variety of different types of computing systems.

Figure 1:
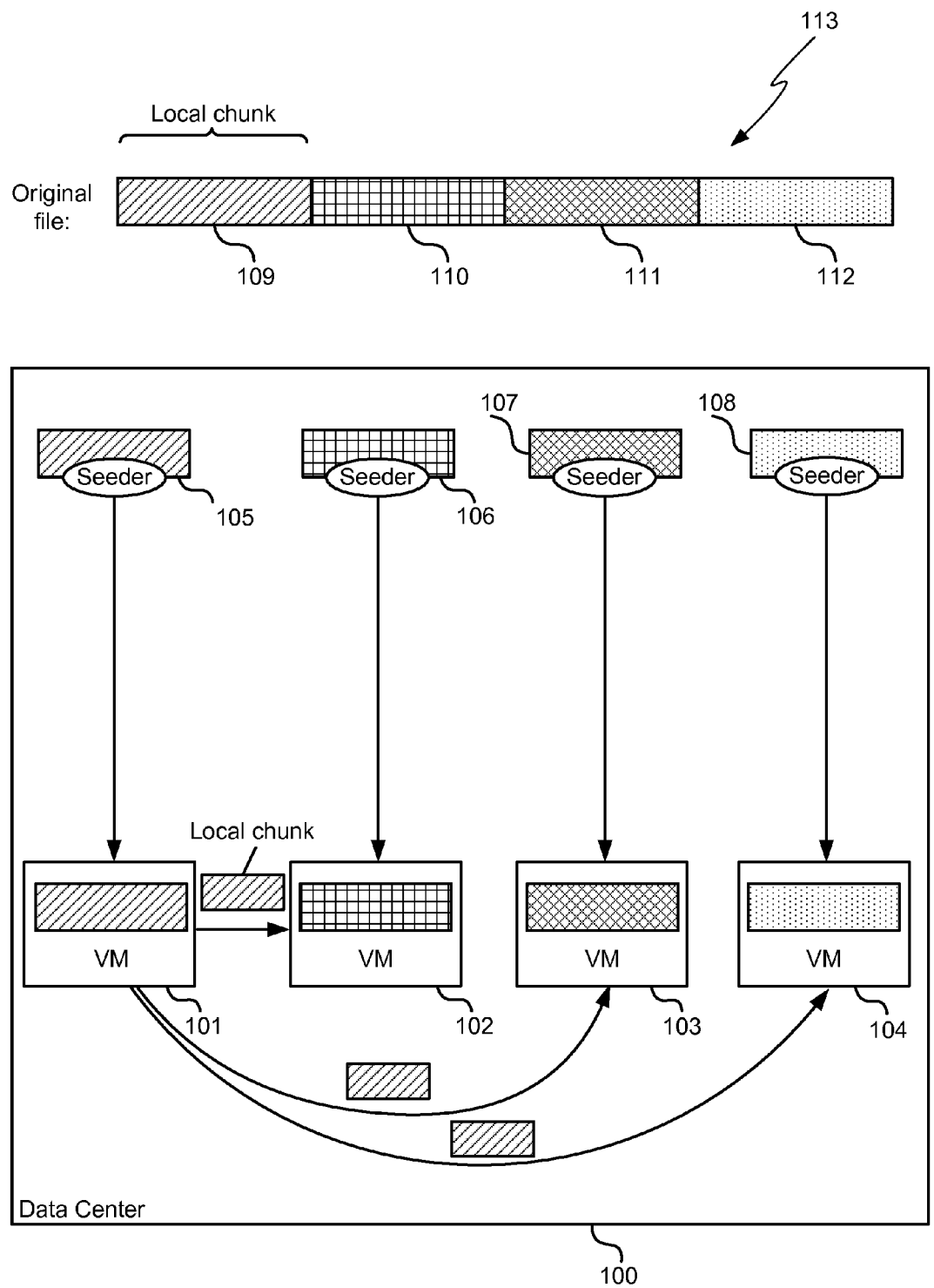
FIG. 1 illustrates a high-level architecture on which an example of a method of downloading a data item from a source internal to a data center to each of a set of nodes of the data center is performed.

FIG. 1 illustrates a high-level architecture on which an example of a method of downloading a data item from a source internal to a data center to each of a set of nodes of the data center is performed. Before proceeding further with the detailed description of FIG. 1, however, a few items of the embodiments will be discussed.

A first aspect refers to a method of downloading a data item from a source to each node of a plurality of nodes of a data center, wherein the data item is (initially) split in a plurality of disjoint chunks. In other words, the disjoint chunks (together) form the data item. Each chunk of the plurality of chunks is received from the source by only one node of the plurality of nodes. The plurality of chunks are distributed (exchanged) among the plurality of nodes within the data center until each node of the plurality of nodes has the plurality of chunks forming the data item.

The term "download" as used herein is used to describe the whole process, but also for the first step in which the nodes receive chunks, before the distribution (broadcast) step.

The feature "receiving each chunk from the source by only one node" is not to be restrictively construed in the sense that all chunks are received by one and the same node (which is covered by the feature), but also encompasses situations where different chunks are received by different nodes. However, the feature is to be construed in the sense that it excludes situations of redundant data transmission, i.e. where one chunk is received by more than one node, e.g. where one chunk is downloaded by two (or more) nodes.

While the words "distribute" or "exchange" typically mean that the node keeps the received chunk and sends copies of it to the other nodes, it may also occur that the node sends the chunk away (loses it) and later receives a copy from another node.

In some of the embodiments, a "node" is a physical network node which is an active electronic device that is attached to a network, and is capable of sending, receiving, or forwarding information over a communications channel, for example a server computer. In other embodiments, a node is a virtual machine (typically in a cloud computing environment) of a data center.

Some embodiments refer to the context of "cloud computing" which, according to one definition, is the use of computing resources (hardware and software) that are delivered as a service over a network (typically the Internet). End users access cloud-based applications for example through a web browser while the business software and user's data are typically stored on servers at a remote location at a data center (e.g. "cloud storage").

The term "virtual machine", as used herein in the context of cloud computing, means a software program or operating system that not only exhibits the behavior of a separate computer, but is also capable of performing tasks such as running applications and programs like a separate computer. A virtual machine, usually known as a guest is created within another computing environment referred as a "host". Multiple virtual machines can exist within a single host at one time. A virtual machine is also known as a guest. Isolation ensures that applications and services that run within a virtual machine cannot interfere with the host operating system or other virtual machines. Virtual machines are implemented by software emulation methods or hardware virtualization techniques. A system virtual machine is a system platform that supports the sharing of the host computer's physical resources between multiple virtual machines, each running with its own copy of the operating system. Virtual machines allow an efficient use of hardware.

A "data center" is a facility used to house computer systems and associated components, such as telecommunications and storage systems. It generally includes redundant or backup power supplies, redundant data communications connections, environmental controls (e.g., air conditioning, fire suppression) and security devices. Data centers offer a fast and highly reliable internal computer network infrastructure which makes data transfer within the data center fast and highly reliable in contrast to data transfer between the data center and an external data source. In the embodiments where two or more (possibly administratively or geographically distinct) data centers are substantially as well connected among themselves and provide as fast and highly reliable data transfer among themselves as within one data center, then these two or more data centers are considered to be one data center.

The term "data stage-in", which has already been used above, refers to the bringing in/introduction/incorporation of data from an external source to a deployment. A deployment is a set of virtual machines available to a user.

The term "data item" means any block of arbitrary information which is available to a computer program, for example a data file, while the term "chunk" as used herein refers to a fragment or part of the data item. In some of the embodiments the data item is a blob (binary large object or basic large object) which is a collection of binary data stored as a single entity in a database system. Blobs are typically images, audio or other multimedia objects, though sometimes binary executable code is stored as a blob. However, blobs can be any type of files, e.g. plain text files. Back in the pre-cloud computing era, blobs were just used to store binary data in databases.

The term "disjoint chunks" means that the chunks do not overlap, i.e. after splitting each data of the data item is in exactly one chunk.

In some of the embodiments, the source is external to the data center while in other embodiments, the source is inside the data center (cloud storage). The efficiency is typically higher if applied with sources outside the datacenter, but the method described can also be applied to scenarios where the data is already stored in the cloud storage but not on the virtual machines. In this case it can still lead to performance improvements and to reduced load for the cloud storage infrastructure. In these embodiments, there will be no distinction between external and local chunks as explained in the following.

In some of the embodiments, the chunks are local chunks which are further split in a number of external chunks. Local chunks are used between the nodes within the data center to ensure high throughput. External chunks, which are smaller than local chunks, are used for the transmission of data between the external source and the virtual machines in case of data corruption or data loss. The further splitting of local chunks into external chunks makes it possible that not the entire local chunk needs to be re-transmitted in case of data corruption or data loss, but only the smaller external chunk, in which data was corrupted or lost. In some of the embodiments, the number of external chunks is dynamically determined. The better the connection to the source, the larger external chunks can be, the lower is the number of external chunks.

In some of the embodiments, the download of the chunks occurs in an unbalanced manner in which few nodes receive many chunks, while other nodes only receive few chunks. In other more balanced embodiments, the chunks are equally distributed over the receiving node to distribute the load in a balanced way over the network. In some of the embodiments, the number of chunks equals the number of receiving nodes and each node receives one chunk.

In some of the embodiments, the distribution of the chunks among the nodes is performed by broadcasting the chunks among the nodes. The distribution of the chunks among the nodes can be thought of as a form of cooperation among the nodes. "Broadcasting" refers to a method of transferring data (here: a chunk) to all recipients simultaneously. In computer networking, broadcasting refers to transmitting a packet (here: a chunk) that will be received by every device (here: node, virtual machine) on the network. In practice, the scope of the broadcast is limited to a broadcast domain.

In some of the embodiments, the broadcasting is performed based on a media access control (MAC) protocol. In the seven-layer OSI model of computer networking, the MAC data communication protocol belongs to the MAC layer which is a sublayer of the data link layer, which itself is layer 2. The MAC layer provides addressing and channel access control mechanisms that make it possible for several terminals or network nodes to communicate within a multiple access network that incorporates a shared medium, e.g. Ethernet.

In some of these embodiments, the protocol is based on a multiple access control using carrier sensing and collision avoidance such as the CSMA/CA (Carrier Sense Multiple Access with Collision Avoidance) protocol. CSMA/CA is a network multiple access method in which carrier sensing is used, but nodes attempt to avoid collisions by transmitting only when the channel is sensed to be "idle". CSMA/CA is a protocol that operates in the Data Link Layer (Layer 2) of the OSI model. Collision avoidance is used to improve the performance of the CSMA method by attempting to divide the channel somewhat equally among all transmitting nodes within the collision domain.

In some of the embodiments, a binary exponential back-off strategy is used for collision avoidance. Binary exponential backoff or truncated binary exponential backoff refers to an algorithm used to space out repeated retransmissions of the same block of data, often as part of network congestion avoidance. In CSMA/CA, this algorithm is part of the channel access method used to send data on these networks. In Ethernet networks, the algorithm is commonly used to schedule retransmissions after collisions. The retransmission is delayed by an amount of time derived from the slot time and the number of attempts to retransmit. After c collisions, a random number of slot times between 0 and $2^c-1$ is chosen. For the first collision, each sender will wait 0 or 1 slot times. After the second collision, the senders will wait anywhere from 0 to 3 slot times (inclusive). After the third collision, the senders will wait anywhere from 0 to 7 slot times (inclusive), and so forth. As the number of retransmission attempts increases, the number of possibilities for delay increases exponentially. "Truncated" means that after a certain number of increases, the exponentiation stops; i.e. the retransmission timeout reaches a ceiling, and thereafter does not increase any further.

In other embodiments, the protocol is based on a token-based multiple access control method, such the Token Bus protocol. A token is passed around the network nodes and only the node possessing the token may transmit. If a node does not have anything to send, the token is passed on to the next node. The token does not need to be passed through neighboring nodes. There is no need of defined and static neighboring relationships between nodes. In some of the embodiments, a node tries to get a token only if it has something to transmit.

It is mentioned that while the two protocols mentioned above belong to the data link layer (layer 2) of the OSI model, they are implemented in the embodiments disclosed herein on the application layer (layer 5). Hence, the protocols used in embodiments are not the mentioned MAC protocols themselves but are only based on (or use the same principles as) these protocols. In some of those embodiments, where the Token Bus protocol is used, a broadcast queue is employed while in some of those embodiments, where CSMA/CA is employed the node (more precisely the implemented data stage-in software components) can also just check if it is receiving something from another group/deployment node. Thus, CSMA/CA may work without a queue.

In some of the embodiments, the broadcasting is implemented using a broadcast token queue to avoid concurrent broadcasts.

In some of the embodiments, the broadcast token queue uses an invisibility timeout which will be explained in the description of FIG. 4

Some of the embodiments rely on the insight that data communication within a data center is typically faster and/or more reliable, mainly because of the physical infrastructure and interconnection of the data center, than the data communication from the data center to an external source. To exploit that insight, each of the local chunks are received by only one node (over the worse data connection) and then internally distributed (over the better data connection). Therefore, in some of the embodiments, data transfer from the source to the plurality of nodes is slower and/or less reliable than data transfer among the plurality of nodes of the data center. As already mentioned above, the method described can also be applied for a download within a data center, typically from a cloud storage, to a set of virtual machines.

In some of the embodiments, the number of external chunks is the smaller the more reliable data transfer between the source and the virtual machines is. If the data transfer is quite unreliable, then a local chunk is to be split into a high number of external chunks (each chunk being quite small) since a re-transmission is quite likely and only few data are then re-transmitted. If the data transfer is relatively reliable, then a local chunk is to be split into a small number of external chunks (each chunk being quite big) since re-transmission is not so likely and in the relatively rare case of a re-transmission, re-transmitting a rather big external chunk is not so detrimental.

In some of the embodiments, the receiving each chunk is done using a client/server fashion, e.g. using a HTTP protocol.

In some of the embodiments, the source external to a data center is a user's on-premises storage infrastructure. In some of the embodiments, the source is a user's personal computer, hard-disk, database system etc. In some of the embodiments, the user's PC is a seeder, while in other embodiments, the user uploads the data item to one or more seeders using a standard protocol like FTP or HTTP. In some of the embodiments, the source comprises a plurality of seeders and each chunk is stored on one seeder. As used herein, a seeder is a storage facility containing a part of the data item. In other embodiments, a seeder stores the complete data item, but serves only a part of it to a specific data center node.

In some of the embodiments, the source comprises a plurality of seeders and a part of each chunk is stored on each seeder. The receiving comprises that each virtual machine receives those parts forming one chunk, e.g. an external chunk, from each seeder to finally have one complete chunk. In this embodiment, before the method starts, one chunk is distributedly and disjointly stored on all seeders.

In some of the embodiments, the plurality of virtual machines is a user's deployment.

In some of the embodiments, a tracker is contacted to retrieve more information about the data item to be downloaded, wherein the tracker is a service that keeps track of data items and their addresses.

In some of the embodiments, when the tracker is queried, it responds with information about the data item and seeders that can be contacted for downloading the data item.

In some of the embodiments, the steps of receiving chunks and distributing chunks can be executed in parallel. That means that the step of distributing chunks is started while the step of receiving chunks has not yet been completed.

In some of the embodiments the step of receiving chunks is caused by the nodes requesting (downloading) the chunks from the source. It is mentioned that the method presented lends itself for scaling (up and down) since virtual machines and/or seeders can readily be added or removed without substantially changing the method. By using a download coordination queue for managing the download jobs, added virtual machines may grab (pull) a download job. Thus, the whole downloading process can scale with additional virtual machines. The system is also failsafe regarding removed virtual machines or virtual machines that crashed while downloading, since uncompleted download jobs just get visible again in the queue, after a setup timeout.

A second aspect refers to one or more computer-readable media which include computer-executable instructions stored thereon which when executed by one or more processors cause the one or more processors to perform a method of downloading a data item from a source to a plurality of nodes of the data center, the data item being split in a plurality of disjoint chunks. Each chunk of the plurality of chunks is received from the source by only one node of the plurality of nodes. The plurality of chunks are distributed among the plurality of nodes within the data center until each of the plurality of nodes has the plurality of chunks forming the data item.

Finally, a third aspect refers to a deployment of virtual machines in a data center arranged to execute a method of downloading a data item from a source to each virtual machines of the deployment of the data center, the data item being split in a plurality of disjoint local chunks which are further split in a number of external chunks. Each local chunk is received from the source by only one virtual machine of the deployment. In case of data loss or data corruption, those external chunks are received again which are affected by the data loss or the data corruption. Each local chunk of the plurality of local chunks are distributed among the deployment of virtual machines within the data center until each virtual machine of the deployment has the plurality of local chunks forming the data item.

While individual features of embodiments have explained separately above, it is clear that the features can be combined within one embodiment.

Returning now to FIG. 1, which shows a data center 100 with a user's deployment of four virtual machines 101, 102, 103, 104. An original file 113 which contains 4 terabyte of meteorological data is to be downloaded to each of the virtual machines 101, 102, 103, 104 is split into four local chunks 109, 110, 111, 112. A weather simulation program is executed on each of the virtual machines 101, 102, 103, 104, each of which needs the complete original file 113 of meteorological data. In the example shown, the number of local chunks is equal to the number of seeders 105, 106, 107, 108 which are part of a cloud storage within the data center 100. Initially, chunk 109 is stored on seeder 105, chunk 110 is stored on seeder 106, chunk 111 is stored on seeder 107 and chunk 112 is stored on seeder 108 so that each seeder 105, 106, 107, 108 contains one of the four disjoint local chunks 109, 110, 111, 112. Subsequently, each local chunk 109, 110, 111, 112 is transmitted to its corresponding receiving virtual machine 101, 102, 103, 104. Once each virtual machine 101, 102, 103, 104 has received its local chunk 105, 106, 107, 108, the virtual machines 101, 102, 103, 104 cooperate to exchange their local chunks 105, 106, 107, 108 such that in the end, each virtual machine 101, 102, 103, 104 has the complete original file 113. For cooperation, the virtual machines 101, 102, 103, 104 use well-known MAC protocols, such as CSMA/CA or Token Bus which have been discussed above, to manage the coordination between the virtual machines 101, 102, 103, 104. As already mentioned above, in the embodiments these protocols are not implemented on the data link layer but on the application layer of the OSI model.

Figure 2:
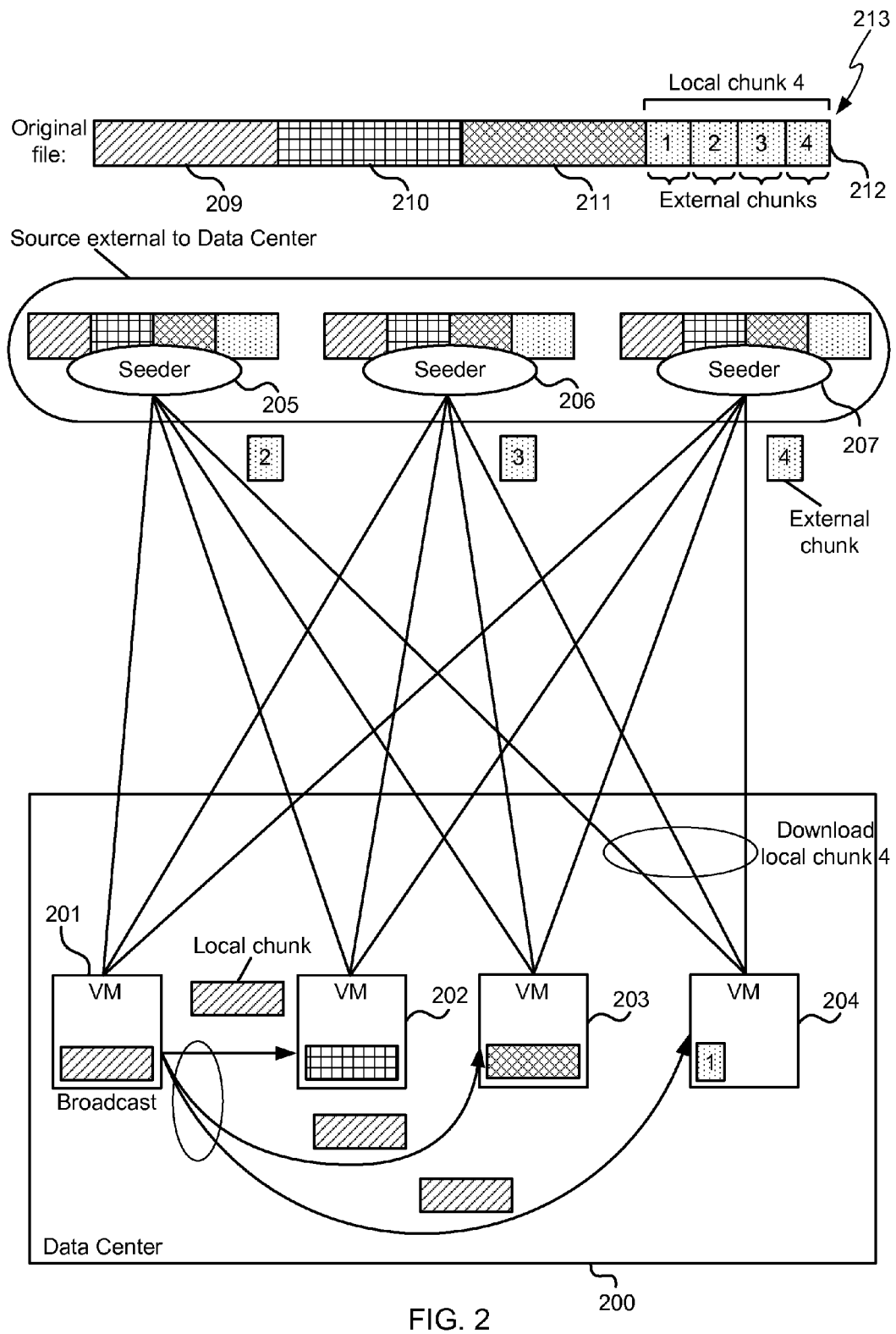
FIG. 2 illustrates a high-level architecture on which another example of a method of downloading a data file from an external source to each of a set of nodes within a data center is performed.

FIG. 2 shows another example of a method of downloading a data file 213 from an external source to each of a set of virtual machines within a data center. The data file 213 is split into four local chunks 209, 210, 211, 212 for four receiving virtual machines 201, 202, 203, 204 of a user's deployment. In contrast to the example shown in FIG. 1, the original file 213 is stored on three external seeders 205, 206, 207 (outside the data center 200). Each of the three seeders 205, 206, 207 contains a part of each local chunk 209, 210, 211, 212. It is exemplarily shown that local chunk 212 is further split into four external chunks 1-4, while each of the other chunks 209, 210, 211 is also further split into four external chunks. If data is lost during transmission of the local chunks, then not the complete local chunk is re-transmitted but only the external chunk affected by the data loss. Each virtual machine 201, 202, 203, 204 downloads from each seeder 205, 206, 207 a part of the corresponding chunk so that in the end virtual machine 201 has local chunk 209, virtual machine 202 has local chunk 210, virtual machine 203 has local chunk 211 and virtual machine 204 has local chunk 212. There is no redundant transmission of local chunks 209, 210, 211, 212 since each local chunk 209, 210, 211, 212 is transmitted only once from the source (the seeders 205, 206, 207) to one of the virtual machines 201, 202, 203, 204. Although different parts of each local chunk 209, 210, 211, 212 are downloaded from different seeders 205, 206, 207, each local chunk 209, 210, 211, 212 is received at only one of the virtual machines 201, 202, 203, 204. Each virtual machine tries to download from as many seeders as possible. This way the load is distributed over all seeders and there is no need of an initial coordination between the virtual machines 201, 202, 203, 204 in the data center 200. After having received the local chunks 209, 210, 211, 212, each virtual machine 201, 202, 203, 204 broadcasts a received local chunk to all other virtual machines 201, 202, 203, 204. In the presented example, virtual machines 201, 202, 203 have their complete local chunks 209, 210, 211, 212, while virtual machine 204 is still waiting for external chunks 2, 3 and 4 of local chunk 212. Virtual machine 201 has already retrieved a broadcast token and is broadcasting its local chunk 209 to the virtual machines 202, 203, 204.

Figure 3:
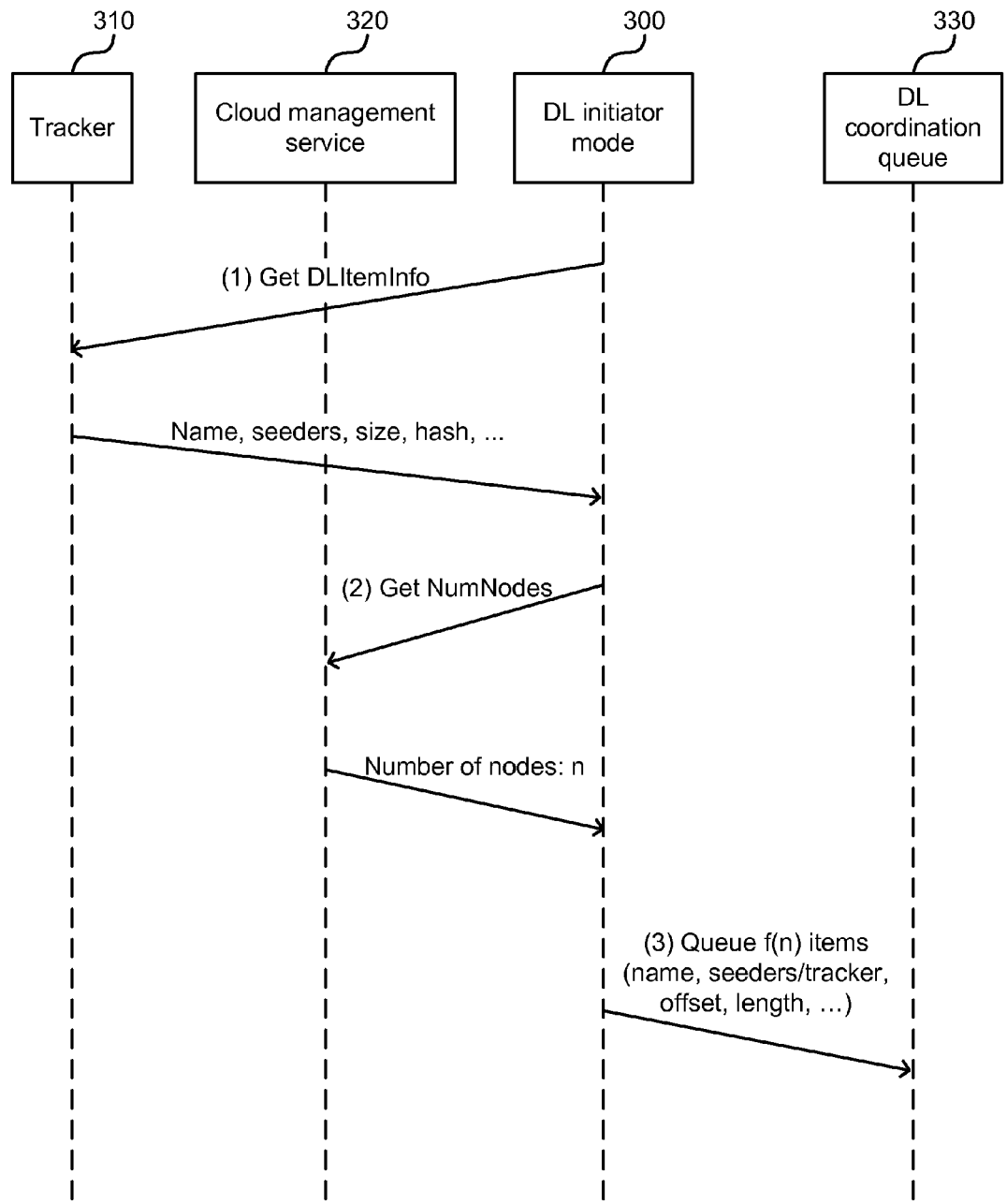
FIG. 3 illustrates an initiation of a cooperative download.

FIG. 3 illustrates initiation of a cooperative download (receipt of local chunks at nodes, before broadcast) according to some embodiments. The download (DL) initiator node 300, which is one of the nodes in the data center, wants to download a (huge) file that needs to be available on all nodes. First of all, a tracker 310, which is external to the data center, is contacted to retrieve more information about the file that is to be downloaded. The tracker 310 is a service that keeps track of files and their locations (seeder addresses). When queried, it responds with information about the file (name, size, hash, . . . ) and seeders that can be contacted for downloading the file. Having this information the DL initiator node 300 queries its local cloud management service 320 for the total number of available nodes inside the deployment. Based on the response, the DL initiator node 300 decides on the number of local chunks and queues the corresponding number of queue items in a DL coordination queue 330, which is part of a cloud storage provided by some cloud provider. The cloud storage is typically provided by the same provider as the virtual machines 201, 202, 203, 204. Once the download chunks (local chunks, specified by their offset in the original file and their length) are queued, all idle nodes can start downloading the chunks.

Figure 4:
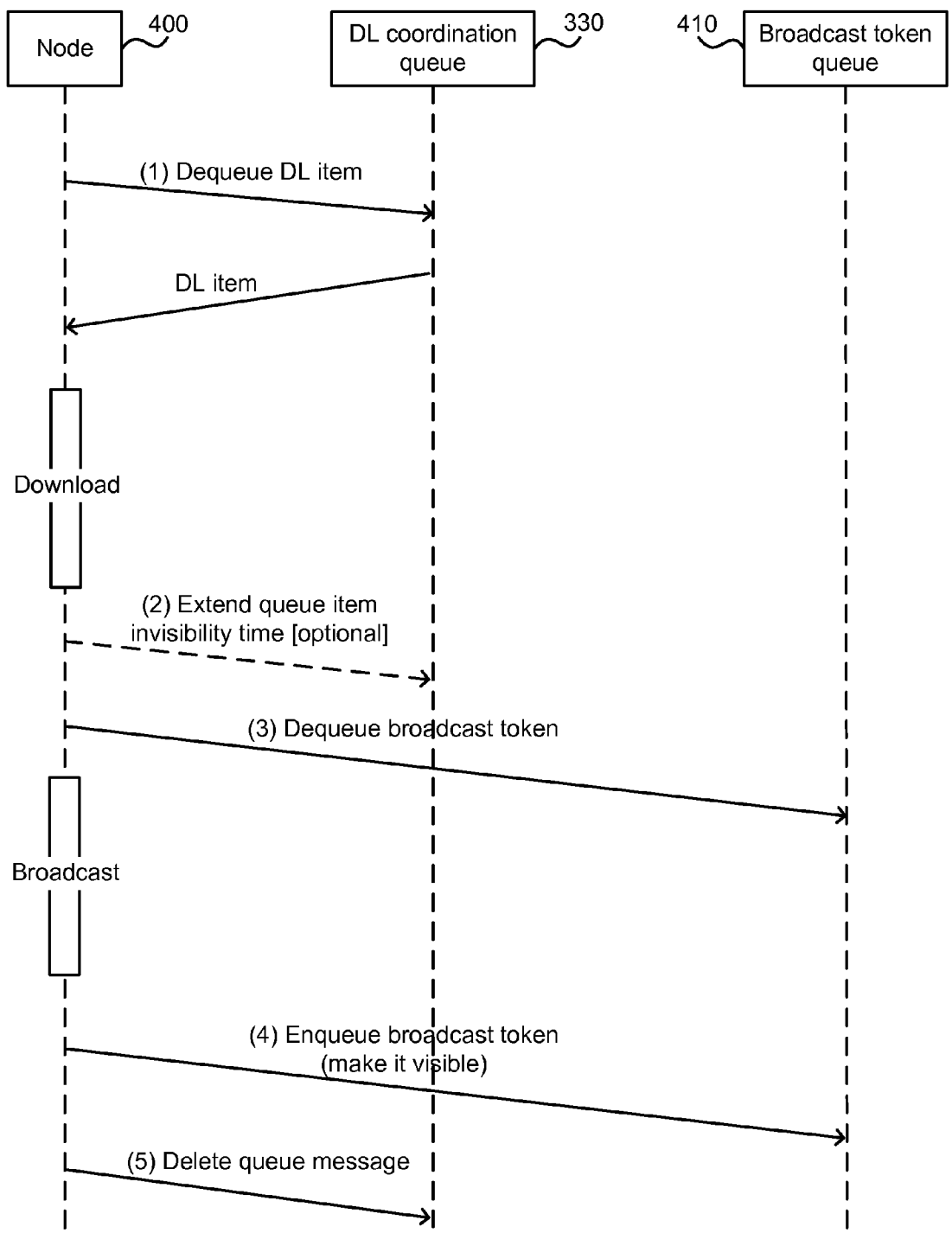
FIG. 4 illustrates download and broadcast of a local chunk.

FIG. 4 shows the download and broadcast of a local chunk. An idle node 400 tries to retrieve a DL item from the DL coordination queue 330 (1). If successful it contacts all available seeders to download the local chunk. Once the local chunk is downloaded by node 400, the node 400 tries to retrieve a broadcast token (3). A broadcast token is used to avoid concurrent broadcasts, which can lead to network congestion. If the retrieval was successful, node 400 can start to broadcast the downloaded local chunk to the other nodes of the deployment in the data center. The broadcast token is returned to a broadcast token queue 410, which is part of a cloud storage provided by some cloud provider, once the broadcast is completed (4). The queue item from the DL coordination queue 330 is deleted after both download and broadcast were successful (5) and the broadcast token is returned to (made visible in) the broadcast token queue 410. The queues 330, 410 specified here use an invisibility timeout. This means that items that are dequeued are not deleted automatically from the queue 330, 410. Instead they just get invisible for a certain amount of time. To remove them permanently from the queue 330, 410, they have to be explicitly deleted after the work specified by the queue item is completed. If the invisibility time runs up before the queue item is deleted, the queue item reappears in the queue 330, 410 and can be dequeued by another node. This way the system is protected from node crashes. There is a tradeoff about how to select a proper invisibility time. Hence instead of selecting an invisibility time for the whole process a shorter invisibility time can be selected and updated once the download is finished (2). This step (2) is optional.

The download coordination queue 330 is for creating multiple download jobs for a single original file, to distribute the download task dynamically to a number of cooperating nodes. Using the CSMA/CA principle at the application layer, a node can just observe the network interface and start a broadcast only if it is not subject to a broadcast itself. No queues are needed in that case. The Token Bus protocol needs the broadcast token queue 410 for out of band signaling to other nodes that a broadcast is happening. The number of broadcast tokens that are used depends to the number of concurrent broadcasts that are allowed. There may be situations where more than one broadcast at a time is allowed.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), graphics processing units.

Figure 5:
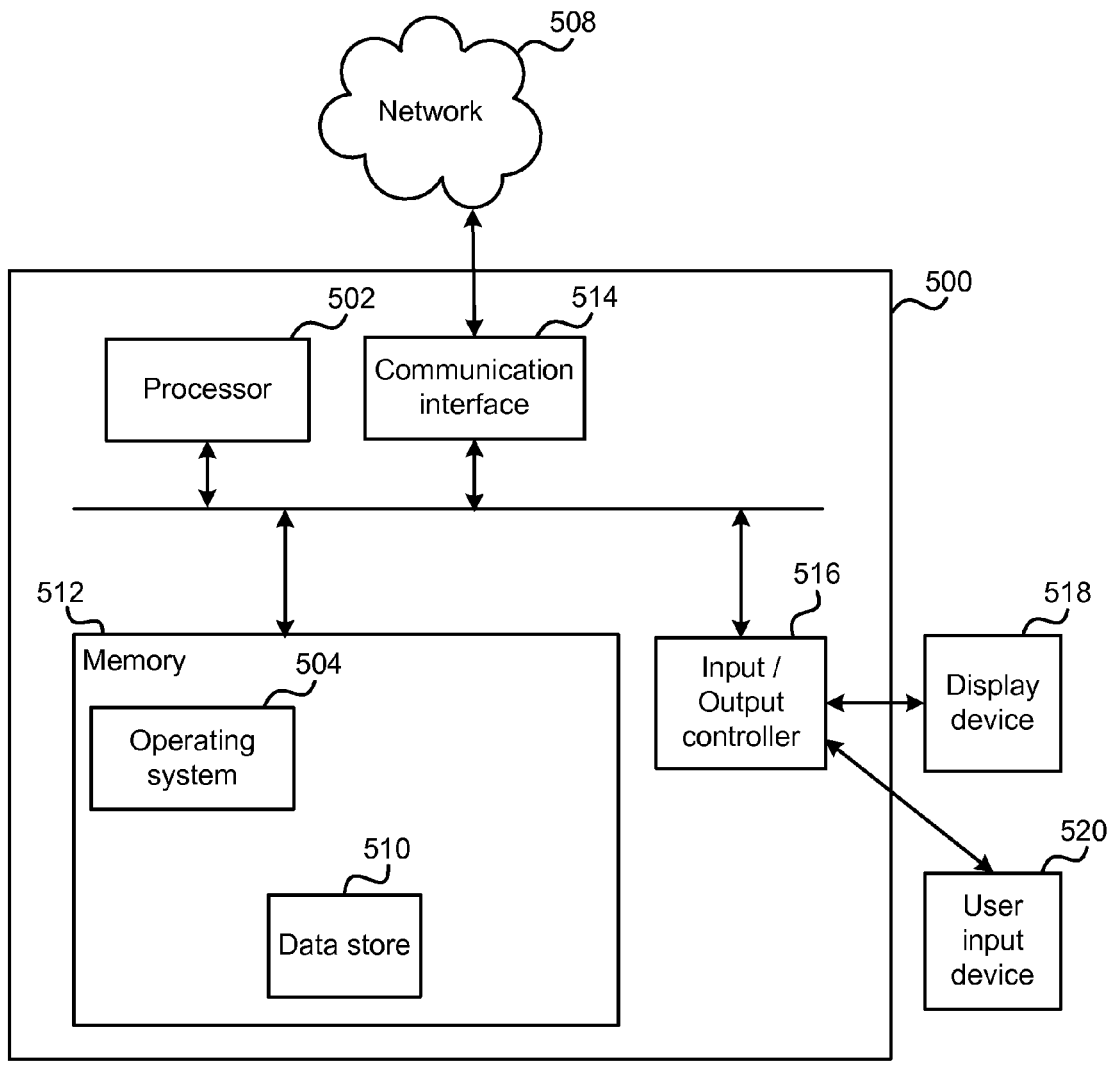
FIG. 5 illustrates an exemplary computing-based device (e.g. a node of a data center) in which embodiments of a method of downloading a data item to each node of a plurality of nodes may be implemented.

FIG. 5 illustrates various components of an exemplary computing-based device 500 which may be implemented as any form of a computing and/or electronic device, and in which embodiments of a method of downloading a file from an external source to each of a plurality of nodes of a data center may be implemented.

Computing-based device 500, which is one of the nodes within a data center to which a data item is downloaded, comprises one or more processors 502 which may be microprocessors, controllers or any other suitable type of processors for processing computer executable instructions to control the operation of the device in order to download a data item from an external source to each of a plurality of nodes. In some examples, for example where a system on a chip architecture is used, the processors 502 may include one or more fixed function blocks (also referred to as accelerators) which implement a part of the download method in hardware (rather than software or firmware). Platform software comprising an operating system 504 or any other suitable platform software may be provided at the computing-based device 500. A data store 510 is provided which may store the downloaded data item. The node is connected with a network 508 which provides less reliable and fast data transfer than the data transfer among the nodes via an internal network (not shown) of the data center. Seeders (not shown) are also connected to the network 508 from which the data item is downloaded to the nodes.

The computer executable instructions may be provided using any computer-readable media that is accessible by computing based device 500. Computer-readable media may include, for example, computer storage media such as memory 512 and communications media. Computer storage media, such as memory 512, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium is not to be interpreted to be a propagating signal per se. Propagated signals may be present in a computer storage media, but propagated signals per se are not examples of computer storage media.

The computing-based device 500 also comprises an input/output controller 516 arranged to output display information to a display device 518 which may be separate from or integral to the computing-based device 500. The display information may provide a graphical user interface. The input/output controller 516 is also arranged to receive and process input from one or more devices, such as a user input device 520 (e.g. a mouse, keyboard, camera, microphone or other sensor). The user input/output device 520 is optional since in a data center the nodes do not need to be connected to I/O devices. Displays and keyboards may be connected through switches. In some examples the user input device 520 may detect voice input, user gestures or other user actions and may provide a natural user interface (NUI). This user input may be used to control the download method, to set parameter values, to view results and for other purposes. In an embodiment the display device 518 may also act as the user input device 520 if it is a touch sensitive display device. The input/output controller 516 may also output data to devices other than the display device, e.g. a locally connected printing device.

The input/output controller 516, display device 518 and optionally the user input device 520 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, rgb camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A method of downloading a data item from a source to each of a plurality of nodes of a data center, the data item being split in a plurality of disjoint chunks, the method comprising:
   receiving each chunk of the plurality of chunks from the source by only one node of the plurality of nodes;
   creating at least one copy of each chunk by at least one of the plurality of nodes; and
   distributing the plurality of chunks among the plurality of nodes within the data center until each node of the plurality of nodes has the plurality of chunks forming the data item.

2. The method of claim 1, wherein the source is external to the data center.

3. The method of claim 1, wherein the nodes of the data center are virtual machines.

4. The method of claim 1, wherein the chunks are local chunks which are further split in a number of external chunks which are received again by the nodes in case of data corruption or data loss.

5. The method of claim 1, wherein the distributing the chunks among the plurality of nodes is performed by broadcasting the chunks among the nodes.

6. The method of claim 5, wherein the broadcasting is performed based on a media access control (MAC) protocol.

7. The method of claim 6, wherein the protocol is based on a multiple access control method using carrier sensing and collision avoidance or on a token-based multiple access control method.

8. The method of claim 6, wherein the broadcasting is implemented using a broadcast token queue to avoid concurrent broadcasts.

9. The method of claim 8, wherein the broadcast token queue uses an invisibility timeout.

10. The method of claim 1, wherein data transfer from the source to the plurality of nodes is slower and/or less reliable than data transfer among the plurality of nodes of the data center.

11. The method of claim 4, wherein the number of external chunks is smaller the more reliable data transfer between the source and the plurality of nodes is.

12. The method of claim 1, wherein the receiving each chunk is done using a client/server fashion.

13. The method of claim 1, wherein the source external to the data center is a user's on-premises storage infrastructure.

14. The method of claim 1, wherein the source comprises a plurality of seeders and each chunk is stored on one seeder.

15. The method of claim 1, wherein the source comprises a plurality of seeders and a part of each chunk is stored on each seeder and the receiving comprises that each node receives those parts forming one chunk from each seeder to finally have one complete chunk.

16. The method of claim 1, further comprising contacting a tracker to retrieve more information about the data item to be downloaded, wherein the tracker is a service that keeps track of data items and their addresses.

17. The method of claim 16, wherein, when the tracker is queried, it responds with information about the data item and seeders that can be contacted for downloading the data item.

18. The method of claim 1, wherein the step of distributing chunks is started while the step of receiving the chunks has not yet been completed.

19. One or more computer-readable storage device comprising:
   computer-executable instructions to receive each chunk of a plurality of chunks from a source by only one node of a plurality of nodes;
   creating at least one copy of each chunk by at least one of the plurality of nodes; and
   distributing the plurality of chunks among the plurality of nodes within a data center until each node of the plurality of nodes has the plurality of chunks forming a data item.

20. A deployment of virtual machines in a data center arranged to execute a method of downloading a data item from a source to each virtual machine of the deployment of a data center, the data item being split in a plurality of disjoint local chunks which are further split in a number of external chunks, the deployment of virtual machines executing tasks comprising:
   receiving each local chunk of the plurality of local chunks from the source by only one virtual machine of the deployment;
   in case of data loss or data corruption, receiving again only those external chunks which are affected by the data loss or the data corruption;
   creating at least one copy of each chunk by at least one of the plurality of nodes; and
   distributing the plurality of local chunks among the deployment of virtual machines within the data center until each virtual machine of the deployment has the plurality of local chunks forming the data item.

* * * * *